US009514467B2

(12) United States Patent
De et al.

(10) Patent No.: US 9,514,467 B2
(45) Date of Patent: Dec. 6, 2016

(54) DYNAMIC POST-DELIVERY CUSTOMIZATION OF TELECOMMUNICATION MESSAGES

(75) Inventors: Pradipta De, New Delhi (IN); Kuntal Dey, New Delhi (IN); Seema Nagar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 13/483,155

(22) Filed: May 30, 2012

(65) Prior Publication Data
US 2013/0325969 A1 Dec. 5, 2013

(51) Int. Cl.
*G06F 15/16* (2006.01)
*G06Q 30/02* (2012.01)
(52) U.S. Cl.
CPC .................................... *G06Q 30/02* (2013.01)
(58) Field of Classification Search
CPC ....................................................... H04L 51/24
USPC ................................................. 709/206–207
See application file for complete search history.

(56) References Cited

U.S. PATENT DOCUMENTS

| 7,844,285 | B2 | 11/2010 | Lorello et al. |
| 2007/0244977 | A1 | 10/2007 | Atkins |
| 2008/0249853 | A1* | 10/2008 | Dekel et al. ................ 705/14 |
| 2010/0272114 | A1* | 10/2010 | Carlson et al. ............. 370/401 |
| 2011/0214046 | A1* | 9/2011 | Haberman et al. ......... 715/202 |
| 2013/0159446 | A1* | 6/2013 | Carlson et al. ............. 709/207 |
| 2013/0290435 | A1* | 10/2013 | Martin .................. H04L 51/28 709/206 |

* cited by examiner

*Primary Examiner* — Karen Tang
(74) *Attorney, Agent, or Firm* — Ference & Associates LLC (57) ABSTRACT

Systems, methods, and products for described herein. One aspect provides for transmitting a message template comprising at least one template element to at least one receiver device, the at least one template element comprising (i) at least one rule and (ii) content having at least one customized element; receiving at least one instantiation request responsive to the message template being opened by at least one receiver device; instantiating the message template as at least one customized message based on the at least one rule and at least one attribute associated with the receiver device, wherein the at least one customized message comprises a specified value for the at least one customized element; and transmitting the at least one customized message to the at least one receiver device. Other embodiments and aspects are also described herein.

14 Claims, 9 Drawing Sheets

From: Airline X
To: Subscriber A
Subject: Airline X Frequent Flier Discount

Dear Subscriber A,

Airline X has selected you to receive a discount of 15% on airfare due to your frequent flier status with our airline.

Thank you,
Airline X

| | |
|---|---|
| Campaign Summary | Airline X Frequent Flier Discount |
| Campaign Content | Discount of <k> percent on airfare computed on total miles flown by subscriber (p) |
| Template Evaluation Rules | k=10: if sum(<#miles flown> by (p)) > 10,000<br>k=20: if sum(<#miles flown> by (p)) > 20,000<br>K+=5: if age(p) < 12 |
| Template Re-instantiation Timeout | Seven days from reading the campaign content, within the campaign validity period |
| Template Edit Trigger Rules | {If at least <x> percent of campaign target base avails discount then trigger campaign edit}<br>{If automatic edit is permissible then set <k>+=abs(<x>-<k>) for all customer where age(p) >= 12} |

| Scenario | Expected Behavior | Implementation |
|---|---|---|
| Template received by user and Deleted | The message was ignored and deleted by user | - Front-End: Remove message.<br>- Back-End: No action; template may be deleted at *lifetime expiry* |
| Template received by user and opened | 1. User may view template summary<br>2. User may receive a new SMS with template instantiated, when within network coverage | - Front-End: Detect template SMS type from header, and (a) show summary, (b) notify Back-End<br>- Back-End: Detect template identification on notification, and send back instantiated SMS |
| Instantiated SMS opened – instance validity expired | 1. User receives an alert: "message expired: new message will be delivered";<br>2. New message may be delivered and received by user when within coverage | - Front-End: Message display blocked with an alert; notification for re-instantiation sent to Back-End<br>-Back-End: Detect template id, re-instantiate, and send updated instance of customized message to user |
| Instantiated SMS opened – instance is still valid | User may view instantiated, customized message | - Front-End: Display customized message<br>- Back-End: No action |
| Instance deleted, template is present | User may open the template and a new instance of SMS message may received | - Front-End: Detect template SMS type from header, and (a) show summary, (b) notify Back-End<br>-Back-End: Detect template identification on notification, and send back instantiated SMS |
| Template deleted, instance is present | User may view the SMS instance, if not expired | If instance is still valid:<br>-Front-End: Display customized message;<br>-Back-End: No action<br>If instance validity has expired:<br>-Front-End: Message display blocked with an alert; notification for re-instantiation sent to Back-End;<br>-Back-End: Detect template id, re-instantiate, and send updated instance of customized message to user |

DYNAMIC POST-DELIVERY CUSTOMIZATION OF TELECOMMUNICATION MESSAGES

FIELD OF THE INVENTION

The subject matter presented and claimed herein generally relates to telecommunication messages and, more specifically, to the dynamic customization of telecommunication messages.

BACKGROUND

Advertisers are continually looking for improved and innovative methods to get their messages in front of consumers. New technologies provide opportunities as well as challenges for advertisement delivery. For example, social networking services provide a new avenue for advertisers, manufacturers, and retailers to communicate with consumers; however, they also add to the increasing amount of information that consumers are subjected to on a daily basis, potentially drowning out the impact of any advertising message. In addition, advertisers now have more messaging channels for communicating with consumer electronic devices, such as smart phones, table computing devices, and more traditional computing devices such as laptop computers. For instance, advertising content may be delivered in the form of email, short message service (SMS) messages (i.e., text messages), in-product advertisements, and banner advertisements. Nonetheless, advertisers are challenged with ensuring that messages delivered through these channels are relevant, timely, and are targeted to interested consumers. As such, advertisers may be best served to harness recent technological advances to efficiently communicate with consumers to maximize the effectiveness of delivered messages.

BRIEF SUMMARY

One aspect provides a method comprising: transmitting a message template comprising at least one template element to at least one receiver device, the at least one template element comprising (i) at least one rule and (ii) content having at least one customized element; receiving at least one instantiation request responsive to the message template being opened by at least one receiver device; instantiating the message template as at least one customized message based on the at least one rule and at least one attribute associated with the receiver device, wherein the at least one customized message comprises a specified value for the at least one customized element; and transmitting the at least one customized message to the at least one receiver device.

Another aspect provides a system comprising: at least one processor; and a memory device operatively connected to the at least one processor; wherein, responsive to execution of program instructions stored on the memory device and accessible to the at least one processor, the at least one processor is configured to: transmit a message template comprising at least one template element to at least one receiver device, the at least one template element comprising (i) at least one rule and (ii) content having at least one customized element; receive at least one instantiation request responsive to the message template being opened by at least one receiver device; instantiate the message template as at least one customized message based on the at least one rule and at least one attribute associated with the receiver device, wherein the at least one customized message comprises a specified value for the at least one customized element; and transmit the at least one customized message to the at least one receiver device.

A further aspect provides a computer program product comprising: a computer readable storage medium having computer readable program code embodied therewith, the computer readable program code comprising: computer readable program code configured to transmit a message template comprising at least one template element to at least one receiver device, the at least one template element comprising (i) at least one rule and (ii) content having at least one customized element; computer readable program code configured to receive at least one instantiation request responsive to the message template being opened by at least one receiver device; computer readable program code configured to instantiate the message template as at least one customized message based on the at least one rule and at least one attribute associated with the receiver device, wherein the at least one customized message comprises a specified value for the at least one customized element; and computer readable program code configured to transmit the at least one customized message to the at least one receiver device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 8 provides a table illustrating customized message system functionality according to an embodiment

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

Advertisers, manufacturers, and retailers are continually taking advantage of technological developments to increase interactions with consumers. For example, companies capitalized on the widespread acceptance and usage of e-mail, turning it into an effective method to inform consumers about products, services, and available discounts. More recently, advertisers have been reacting to the pervasive use of mobile communication devices, such as cell phones and smart phones, and communication services offered through such devices. One popular service is the short message service (SMS), which, in general, allows text messages to be sent to telecommunication devices. Advertisers have operated to send SMS messages to user devices, such as cell phones and smart phones, as part of certain advertisement campaigns.

However, SMS messages are stateless and comprised of static content. As such, SMS messages do not operate based on previous or current information, but are instead handled based on the information that comes with the message, the content of which cannot be changed once the message has been sent. As such, if an entity sends an SMS message to a consumer, the content cannot be changed post-delivery. Therefore, advertising campaigns must send a new SMS message each time that they wish to convey new information and must send different messages to different classes of consumers. For example, if a retailer desires to send an SMS message advertising a 10% discount to returning customers and a 20% discount to new customers, then the retailer must generate and send different messages to each type of consumer, each message containing the corresponding percentage discount. In addition, if the retailer subsequently would like to add an additional 5% to the previously advertised discounts, new messages must again be generated and sent to the consumer devices. As such, advertisers, such as the aforementioned retailer, would greatly benefit from telecommunication messaging that allowed for dynamic customization of messages subsequent to message delivery.

Accordingly, embodiments provide for telecommunication messages configured for dynamic post-delivery customization. In one embodiment, a telecommunication message may be generated based on a message template and delivered to a user device. At the time of delivery, the telecommunication message may be comprised of message elements that are unspecified or generic. The telecommunication message may be instantiated responsive to being opened on the user device, wherein one or more of the generic message elements may be specified based on rules, attributes, timing, or combinations thereof. In one embodiment, instantiation of the telecommunication message elicits the delivery of a customized message comprised of personalized content.

Figure 1:
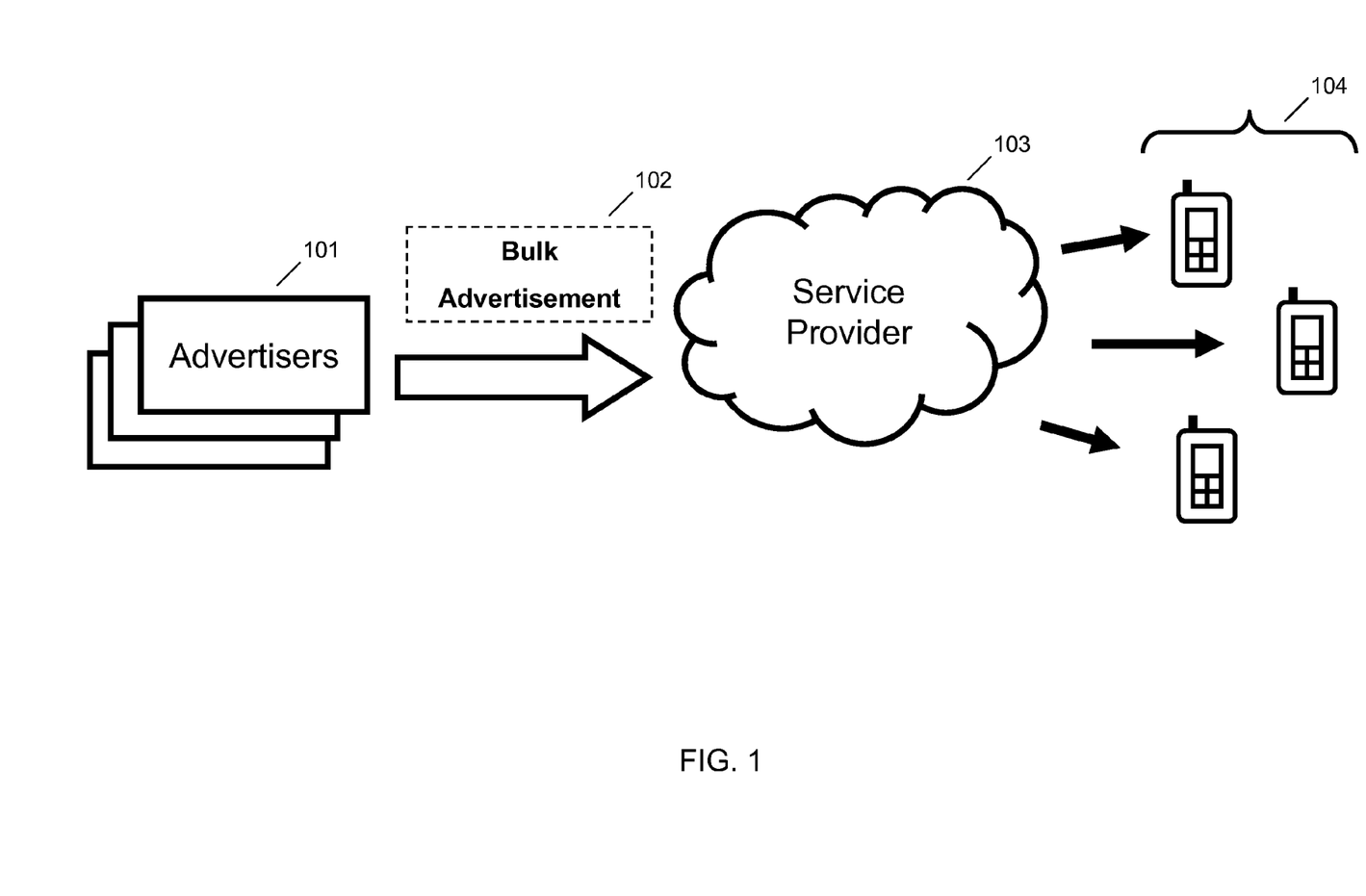
FIG. 1 provides an example telecommunication message delivery architecture.

Referring to FIG. 1, therein is provided an example telecommunication message delivery architecture. A message generating entity 101, such as one or more advertisers, may communicate bulk advertising messages 102 to a service provider 103. For instance, the bulk advertising may consist of a large number of SMS messages each containing the same content, such as a vendor, a product, a price, and product locations. The entity 101 and the service provider 103 may operate under an agreement wherein the service provider 103 operates to send messages, such as SMS messages, to one or more service provider 103 subscribers. The service provider 103 may be any type of communication service provider, such as a telecommunications service provider ("telco"). The service provider 103 may deliver the SMS messages to subscriber telecommunication devices 104, such as smart phones, cell phones, and even land-line phones and computing devices having SMS messaging capability. The example architecture depicted in FIG. 1 provides for the delivery of the bulk advertising messages 102 that are not customized, such that each subscriber receives the same message comprising the same content.

Figure 2:
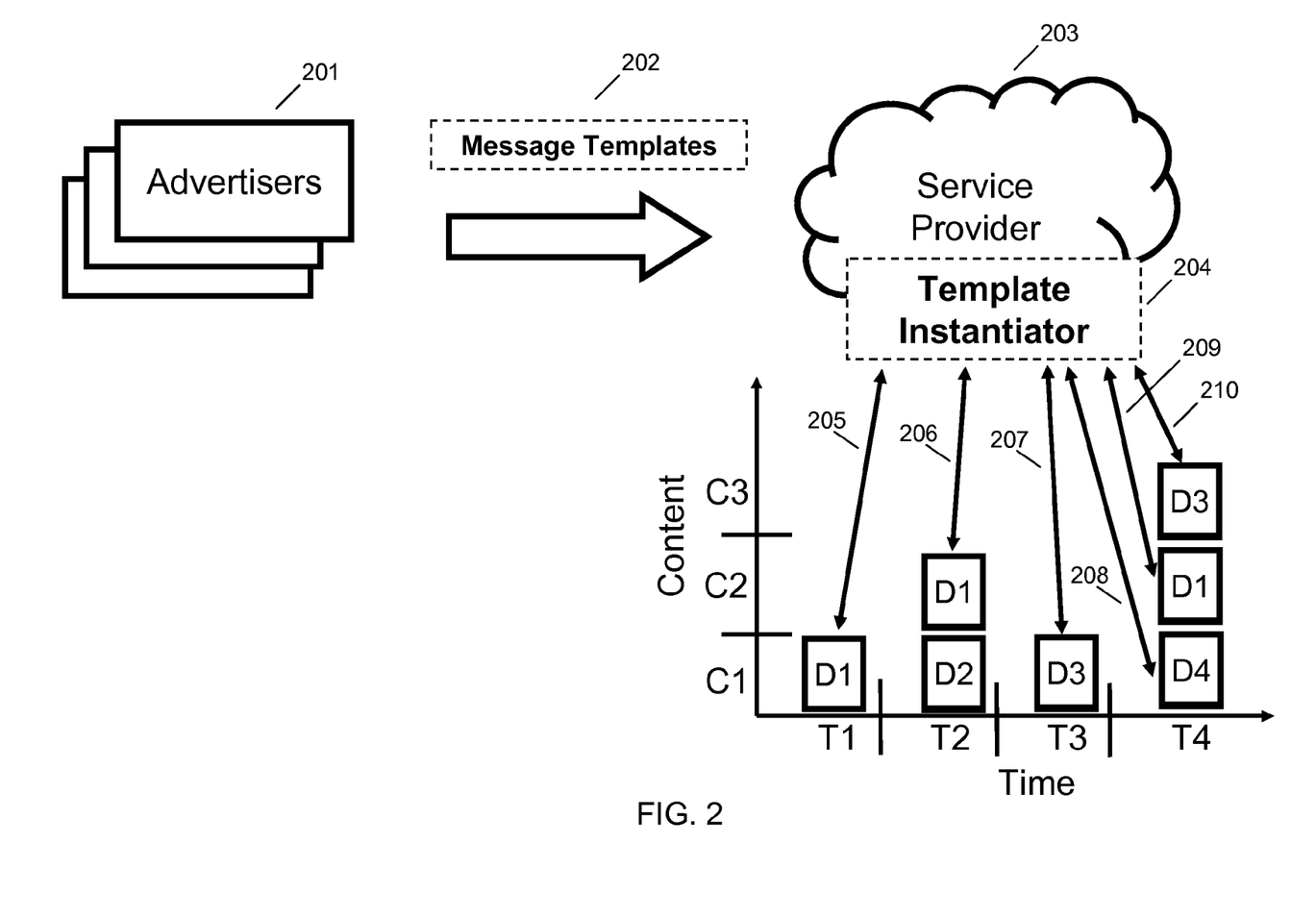
FIG. 2 provides an example customized message system according to an embodiment.

In FIG. 2, therein is provided an example customized message system according to an embodiment. As shown in FIG. 2, a message generating entity 201, such as one or more advertisers, may generate message templates 202 according to embodiments described herein. The message templates 202 may be comprised of information including, but not limited to, message summary, message content, template rules, timeout values, and template edit trigger rules. The message summary may consist of a summary of the message content and may be visible on a telecommunication device D1-D4 before the message is instantiated. For example, the message summary may consist of a generalized statement describing the message source and a high level description of the contents, such as "Message from Company X with a special offer involving product Y."

The message templates 202 may be received at the service provider 203 architecture, or "back-end," and transmitted to subscriber telecommunication devices D1-D4. Responsive to a message template 202 being opened at a telecommunication device D1-D4, a template instantiation request 205-210 may be sent to the service provider 203, for example, to a template instantiator component 204. The template instantiator component 204 may use the template rules and attributes associated with the telecommunication devices D1-D4 to instantiate the template message 202. According to certain embodiments, the template rules may operate to instantiate the template message 202 with content structured according to rules including, but not limited to, objectives, terms, values, text, customer attributes, campaign attributes, campaign context, reinforcements, and combinations thereof as specified by the message generating entity 201. In one embodiment, a rule may involve an optional timeout for instance validity, after which a message template 202 may require re-instantiation before being opened again at a telecommunication device D1-D4. In another embodiment, the customized message may be configured to not change within the timeout specified in the message template if the message has been instantiated. If a user re-opens the message after the timeout has expired, then the message may be different depending upon one or more factors, including, without limitation, a change in relevant user attributes or modifications made to the template message by the message generating entity or at the back-end service provider. In one embodiment, a template or template message may be associated with a lifetime expiration value. The template or template message may be deleted responsive to the expiration of the lifetime expiration value. The timeout may be detected by different mechanisms, such as polling, timers, or event driven mechanisms (e.g., a threshold number of users have viewed a customized message associated with a particular template).

The template instantiator component 204 may compare certain template rules with certain attributes of users associated with the telecommunication devices D1-D4 to arrive at the appropriate customized message to send to the user. In a non-limiting example, an advertising campaign may be configured to provide discount percentages for a particular retailer based on whether a user has responded to such advertisements in the past. As such, a template rule may provide for a $5.00 coupon if a user has responded more than a threshold amount, $10.00 if a user has responded at least once but less than the threshold amount, and $20.00 if the user has never responded to such advertisements. In this non-limiting example, user attributes may at least be comprised of how often a user has responded to advertisements for a particular retailer communicated through telecommunication messages, such as SMS messages, alone or in combination with other communication methods (e.g., email, direct mail, etc.). Accordingly, embodiments provide that the retailer may only be required to send out one message, the message template, in order to provide multiple customized messages, such as different discount offerings. In addition, the retailer does not have to send different messages to different user groups as embodiments may operate to customize the messages based on one or more grouping attributes, such as age, location, purchasing habits, and previous interactions with messages from the retailer. Embodiments provided herein, therefore, provide a scalable model for a message generating entity (e.g., advertiser, manufacturer, vendor, retailer, social media manager, etc.) to generate customized messages for a wide range of users and user groups.

As shown in FIG. 2, the instantiation process may involve a timing component, wherein the content of the customized messages may be determined based on the time T1-T4 of instantiation. For instance, if the user of telecommunication device D1 opens a template message 202 at time T1, the resultant message from the instantiation 205 may be comprised of different content than when the same telecommunication device D1 opens the same template message 202 at time T2 or T4. As the message generating entity 201 may alter the content C1-C3 of the customized messages, embodiments provide that the actual customized message received at a telecommunication device D1-D4 may be a function of the content C1-C3 and the time T1-T4 when the customized message is instantiated, in addition to the individual attributes of the user associated with the telecommunication device D1-D4.

The message generating entity 201 may change, delete, edit, or otherwise modify the template messages 201 and content associated therewith. The template edit trigger rules may be utilized by the service provider 203 to handle template modifications. An illustrative and non-restrictive example provides that a template edit trigger rule may involve changing the percentage of a discount offered in a campaign responsive to one or more events. For instance, a template edit trigger rule may specify that if a certain number of customized message recipients acts on the discount, such as going to a retailer website and making a purchase with the discount, then the amount of the discount may be lowered by an amount specified in the template edit trigger rule. In the alternative, the template edit trigger rule may raise the amount of the discount if a certain threshold number of customized message recipients have not availed themselves of the discount. As such, when a customized message is opened at a telecommunication device D1-D4, the content of the customized message may be determined based on one or more triggering rules that have been affected at the time that the customized message is opened and instantiated.

Accordingly, embodiments may provide specific messages for users and groups of users, which may be displayed at different times under different triggering events. Message generating entities may also modify message content, for example, discount amounts, products, or services, dynamically during a campaign without having to send out a new set of bulk advertising messages. Instead, message generating entities may modify a template which may result in a change in the content of customized messages when viewed by users. As such, message generating entities may operate to provide substantially real-time discounts, offers, and coupons and, in addition, may utilize the messages in conjunction with real-time messaging campaigns, such as social media messaging campaigns.

Figure 3:
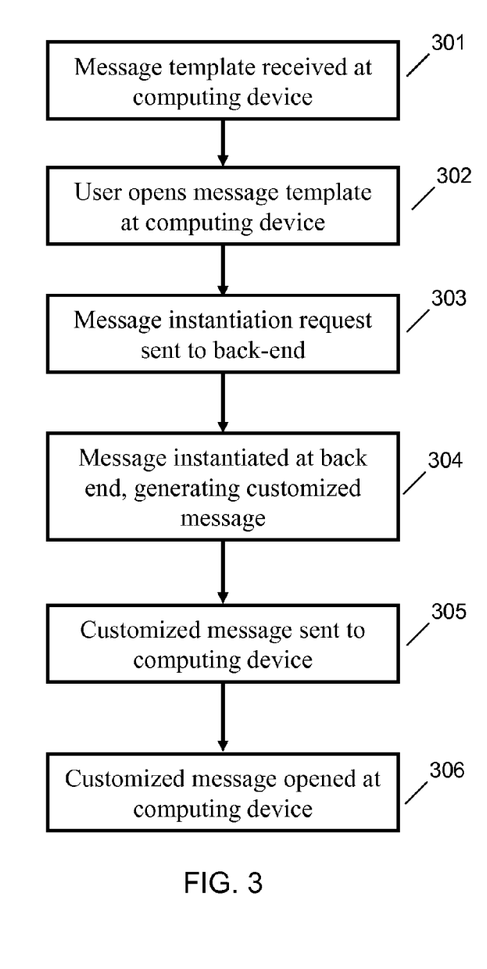
FIG. 3 provided an example process of message instantiation at a user device according to an embodiment.

Referring to FIG. 3, therein is provided an example process of message instantiation at a user device according to an embodiment. A message template is received at a computing device 301, such as a cell phone, smart phone, or tablet computing device. According to embodiments, the message template may be sent in the form of an SMS message. The user may open the message template at the computing device 302. The opening of the message may trigger a message instantiation request 303, which may be sent to the back end (e.g., service provider) for instantiation. The message may be instantiated at the back end, and a corresponding customized message may be generated from the message template 304. The customized message may be communicated to the computing device 305, wherein the user may open and view the customized message 306. According to embodiments, the opening and viewing of a customized message appears seamless to the user, as the process occurs in a manner such that the use may be unaware that they are actually opening a message template that is being instantiated by a back-end service provider architecture. To the user, it simply appears as though they are opening a message that has been tailored for them.

Figure 4:
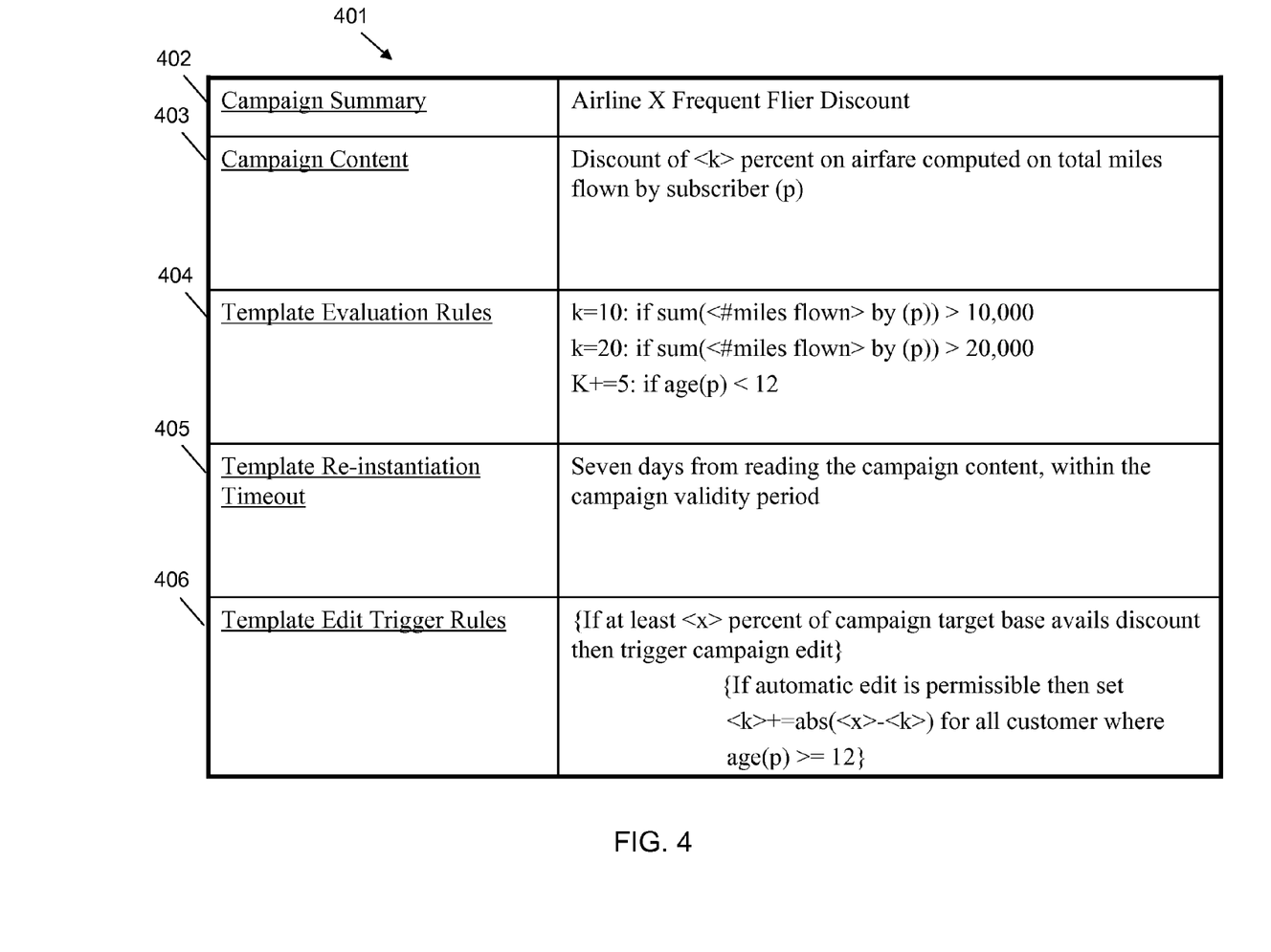
FIG. 4 provides an example message template according to an embodiment.

In FIG. 4, therein is depicted an illustrative message template according to an embodiment. The message template 401 may be comprised of one or more message template elements, including, without limitation, a campaign summary 402, campaign content 403, template evaluation rules 404, template re-instantiations timeout, and template edit trigger rules 406 elements. The campaign summary 402 element may provide a summary of the campaign, such as "Airline X Frequent Flier Discount." The campaign content 403 may comprise the actual customized message the message generating entity intends to deliver to one or more groups of subscribers, such as a certain percentage discount on airfare offered by Airline X based on total miles flown by certain subscribers. The template evaluation rules 404 may be used to fill in variables or customized elements in the campaign content 403. For instance, the template evaluation rules 404 may be configured to calculate the percentage discount contained in the campaign content 403 according to one or more evaluation rules related to one or more subscriber attributes, such as the number of miles the subscriber has flown with the particular airline. A template re-instantiation timeout 405 element may be configured to specify how long the message template 401 may be re-instantiated after it has been sent. For example, the message template 401 may only be re-instantiated for a specified time period, such as seven days from the time that the subscriber has read the campaign content 403. One or more template edit trigger rules 406 may operate to edit the customized message resulting from the message template 401 responsive to one or more triggers. For instance, if a certain threshold of subscribers utilize the discount included in the campaign content 403, then the amount of the discount may be modified for all subscribers or only for certain groups of subscribers. Embodiments provide that the editing of template messages and, therefore, customized messages may be manual, automatic, or semi-automatic. In one embodiment, automatic or semi-automatic editing may plug into one or more analytics systems, thus creating a scope for an end-to-end campaign solution.

The message template 401 may be sent to one or more target subscribers. According to embodiments, campaign target selection may be done separately according to campaign requirements. If campaign template attributes require filtering of the selected campaign targets, the filtering may be completed as a preprocessing step before the template messages 401 are sent. For example, subscribers that have flown less than ten thousand miles may be filtered out of the target audience and will not receive the template message 401.

Figure 5A:
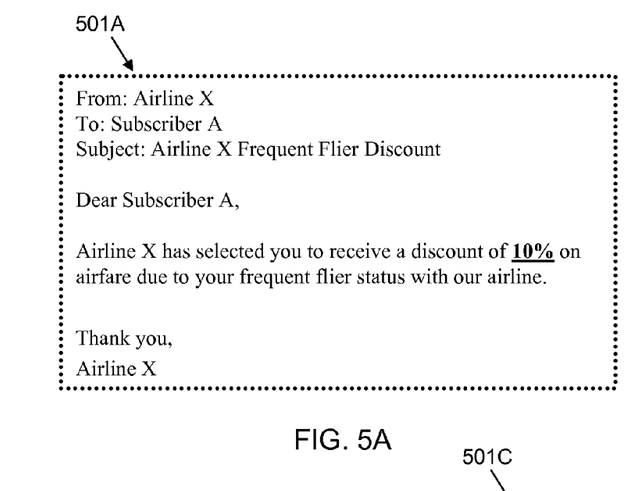
FIGS. 5A-5C provide example customized messages configured according to an embodiment.
Figure 5B:
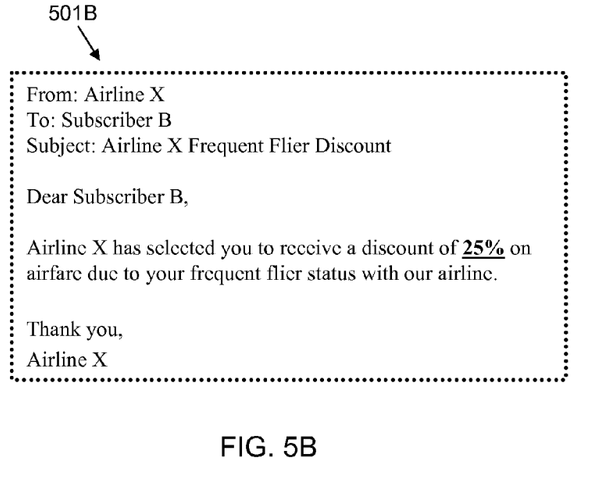
Figure 5C:
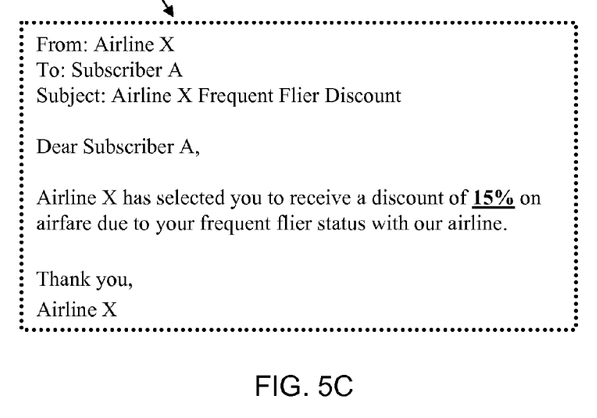

FIGS. 5A-5C provide example customized messages configured according to the example message template 401 illustrated in FIG. 4. Customized message 501A depicted in FIG. 5A may be a customized message generated from message template 401 for a subscriber (Subscriber A) over the age of twelve with greater than ten thousand frequent flier miles, but less than twenty thousand frequent flier miles, resulting in a 10% discount. In FIG. 5B, the customized message 501B may be for a subscriber (Subscriber B) having over twenty thousand frequent flier miles and being under the age of twelve, resulting in a 25% discount. Customized message 501C shown in FIG. 5C may be comprised of content after a template edit trigger for a subscriber with the same attributes as the subscriber described in FIG. 5A (Subscriber A). In the example of FIG. 5C, the template edit trigger may comprise a certain percentage of users utilizing the discount. For instance, if 5% of message recipients utilize the offered discount, the original discount offered to Subscriber A in FIG. 5A, may now be increased by 5% according to the template edit trigger rule 406 associated with the message template 401, resulting in a discount of 15%. When a subscriber opens a message that is affected by a template edit trigger that has resulted in an edited template message, a first-time instantiation or a re-instantiation of message may occur depending upon whether the template has already been instantiated. Nonetheless, the subscriber may view the updated campaign content upon instantiation if the customized message has not been previously viewed or upon re-instantiation if the customized message has been previously viewed.

Figure 6:
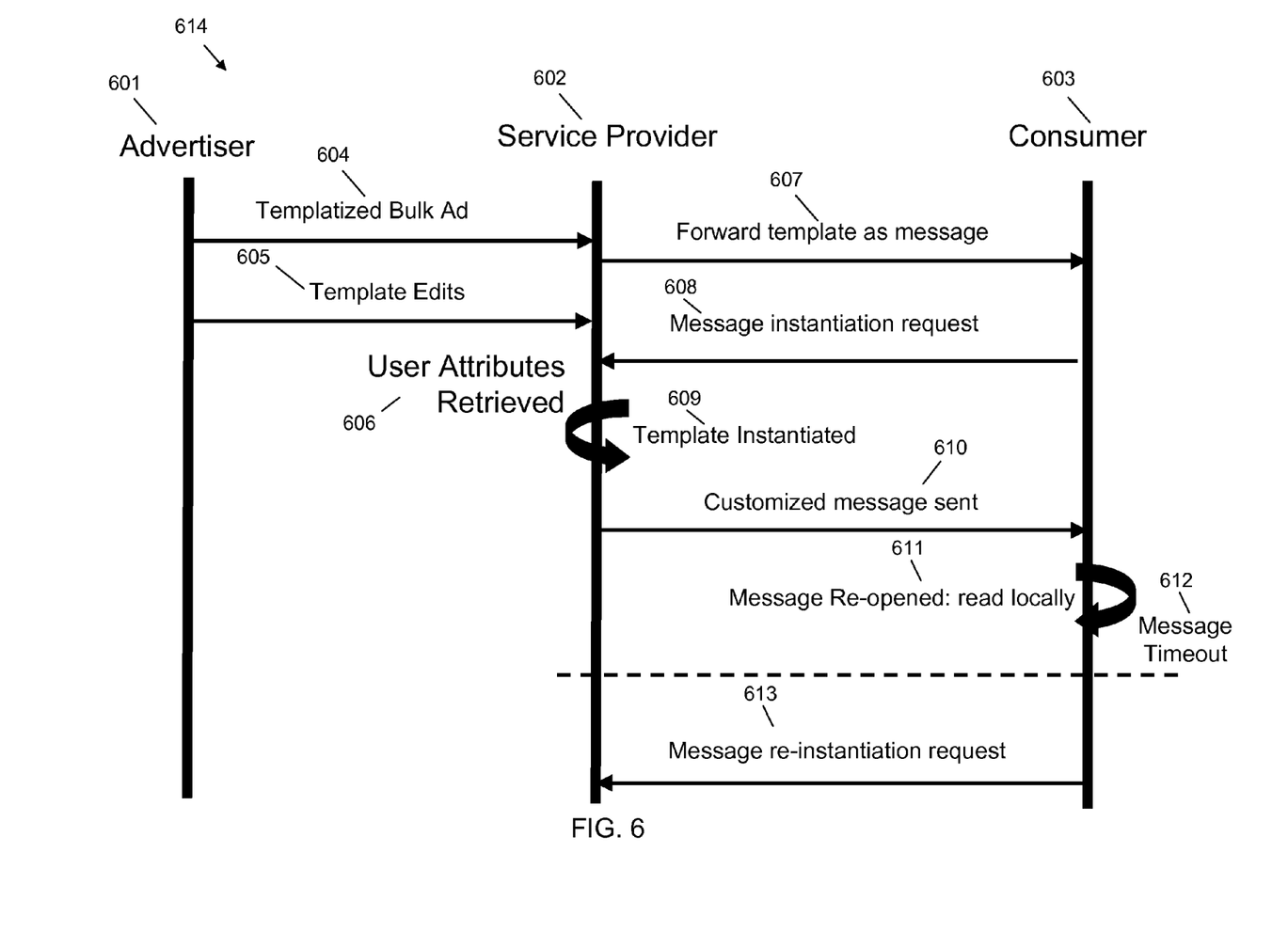
FIG. 6 provides an example communication flow for the customized message system configured according to an embodiment.

Referring to FIG. 6, therein is provided an example communication flow for a customized message system configured according to an embodiment. The customized message system 614 may be comprised of a message generation entity in the form of an advertiser 601, a service provider 602, and a consumer 603 having a telecommunication device in communication with the service provider 602. The advertiser 601 may operate to send templatized bulk ads 604 to the service provider, the templatized bulk ads 604 comprising advertising messages in a template form as provided according to embodiments described herein (e.g., FIG. 4). The advertiser 601 may also operate to communicate template edits 605 to the service provider. The template edits 605 may consist of changes, amendments, additions, deletions, or any other type of modifications to the content of the templatized bulk ads 604, including modifications to the number and structure of rules, message content, message lifespan, or message edit triggers.

The service provider 602 may forward the template as a message to the consumer 607. For example, the service provider 602 may send the template as an SMS message to a telecommunication device associated with the consumer. The service provider 602 may operate to receive message instantiation requests 608 from consumers 603 responsive to the template messages being opened at the consumer telecommunication devices. The service provider 602 may instantiate the template 609 corresponding to a message instantiation request 608 and send the customized message 610 to the consumer 603. In one embodiment, if the consumer 603 re-opens the message 611, and the message has not timed-out and has not been edited by the advertiser 601, then the message may be opened and read locally 611 at the consumer 603 telecommunication device. In another embodiment, the customized message may timeout 612 and, responsive to being opened by the consumer 603 after timing out, the consumer 603 telecommunication device may operate to send a message re-instantiation request 613 seeking to receive an updated version of the customized message.

The customized messages sent to consumer devices may be configured to operate according to existing communication methods, for example, through augmented protocols. An exemplary communication method may involve SMS messaging. Embodiments provide for a modified model of SMS messaging, configured to facilitate the customized messaging system as provided according to embodiments described herein. In one embodiment, the modified model of SMS messaging may be built on the SMS messaging header format. For example, the message template SMS model may be configured to be identifiable at the receiving device, such as a telecommunication device (e.g., cell phone, smart phone). The message template may instantiated by the telecommunication device parsing an extra bit, sending an SMS to a back-end number which includes a template identification element that is embedded in the message template, for example, parsing of a few extra fields on top of present SMS header parsing capabilities. In response to receiving the SMS message from the user telecommunication device, the back-end may instantiate the template and send the instantiated SMS message to the user telecommunication device. According to embodiments, if a user is out of the coverage area provided by the back-end service provider, a summary of the message template (e.g., campaign summary 402) may be viewed at the user telecommunication device until the user is within a coverage area.

As described herein, the standard SMS protocol may be used for exchanging customized messages, for example, utilizing a modified model of SMS messaging. According to certain embodiments, the modified model of SMS messaging may involve the addition of a "SMS Template type" to the current type fields present in the SMS protocol to identify the customized message at the receiving device.

When the message type is detected at the receiving device to be a "SMS Template type," a call back to the back-end may be triggered. In response, the back-end may instantiate the actual message and send the instantiated message to the receiving device. Embodiments provide that the modified model of SMS messaging may also involve enhancements for viewing a customized message. In one embodiment, when a SMS message is being viewed, the header fields of the SMS message may be parsed. For example, a customized message may contain a field carrying the expiration date of the message. In another embodiment, if the message is older than expiration date, the viewer may block the message and the device may contact the backend to generate a new instantiation of the message.

Figure 7:
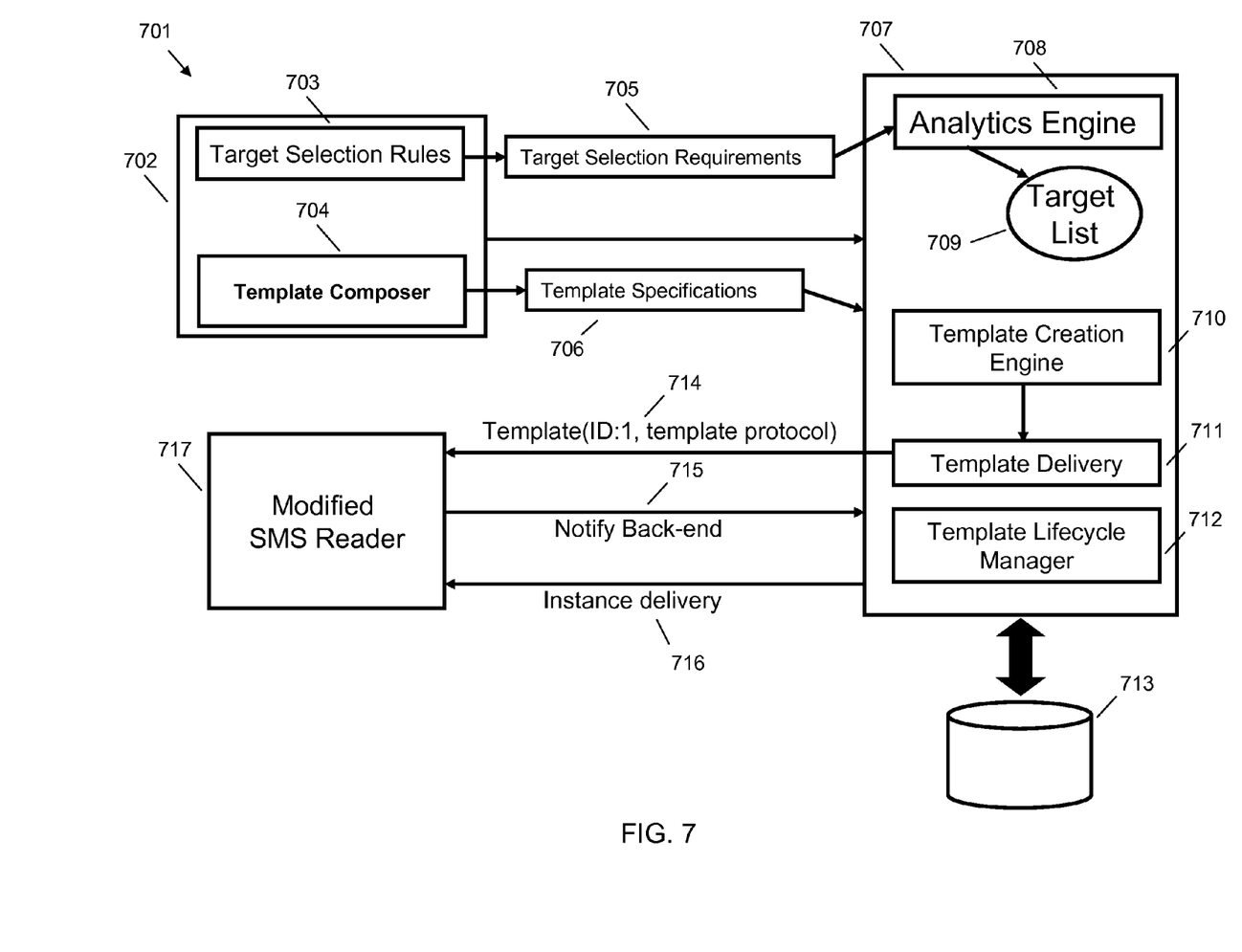
FIG. 7 provides an example customized message system according to an embodiment.

FIG. 7 provides an example customized message system according to an embodiment. As shown in FIG. 7, a message customization system 701 may be comprised of a message generating entity 702, a back-end system 707, and a message receiver 717. The message generating entity 702 may have a set of target selection rules 703 configured to target messages to one or more receivers 717, including groups of receivers associated by one or more attributes, such as age, income, education, purchasing habits, responsiveness to previous messages, geographic location, associated computing and communication devices, or profile information. The target selection rules 703 may be used to send a set of target selection requirements 705 to the back-end system 707. In the embodiment depicted in FIG. 7, the back-end system 707 may feed the target selection requirements into a data processing system, such as an analytics engine 708, to produce a target list 709. The target list 709 may include one or more sets of receivers 717 that may receive customized messages. According to embodiments, the target list 709 may be broken down into different groups of receivers 717 that may receive different versions of customized messages generated as part of a campaign, such as an adverting campaign.

The message generating entity 702 may also be comprised of a template composer 704 configured to compose message templates according to embodiments described herein. The message generating entity 702 may communicate template specifications 706 generated by the template composer 704 to the back-end system 707. A template creation engine 710 resident in the back-end system 707 may utilize the template specifications 706. The back-end system 707 may operate to deliver the templates 711 to receivers 717, for example, as specified by the target list 709. In order to achieve efficiency gains, a back-end system 707, such as a telecommunications service provider, may be configured to utilize a gateway to facilitate the instantiation and transmission of customized messages.

In FIG. 7, a template message may be sent as a template having a template identification and a template protocol 714, such as a modified SMS protocol. The template message may be received at a receiver 717 capable of handling SMS messages and modified SMS messages. For example, the receiver 717 may be a telecommunications device, such as a telecommunications handset device, capable of reading modified SMS messages. The receiver 717 may notify the back-end system 707 when the message has been opened, for example, in the form of an instantiation request. In response, the back-end system 707 may instantiate the message according to embodiments provided herein and may deliver the message instance 716 to the receiver 717.

In the embodiment depicted in FIG. 7, the back-end system 707 may have a template lifecycle manager 712 configured to manage the lifecycle of template messages and customized messages. For example, the template lifecycle manager 712 may operate to monitor for any timeouts, message expiration, or template edits and to respond according to embodiments provided herein, such as requiring re-instantiation of customized messages wherein the template has expired or has been edited since the customized message was last opened at the receiver 717.

The back-end system 707 may operate to store information related to template messages, customized messages, and receiver interactions therewith in one or more data repositories 713. The information stored in the data repositories 713 may include, without limitation, the actual template and customized messages, receiver identification information, as well as information associated with the template and customized messages, such as creation date, edit status, delivery date, and read status.

Referring to FIG. 8, therein is provided a table illustrating customized message system functionality according to an embodiment. The table shown in FIG. 8 describes the implementation of customized message system functions under certain scenarios that may be associated with certain expected behavior. Embodiments are not limited to the scenarios, expected behavior, or implementations depicted in FIG. 8, as the examples are for illustrative and non-restrictive purposes. Embodiments are not limited in this context.

The Unstructured Supplementary Service Data (USSD) protocol may complement the customized message system provided according to embodiments described in this detailed description. The USSD does not support store-forward mechanism; as such, the sender must send SMS to the back-end system and a SMS center (SMSC) back-end may be utilized to store the templates. In one embodiment, the template may be delivered over USSD from SMSC to a receiver, to enable session based communication to the back-end system. For example, a session-based communication may interact with a receiving device to immediately instantiate or re-instantiate a template, and to implement a template instantiation schedule.

Figure 9:
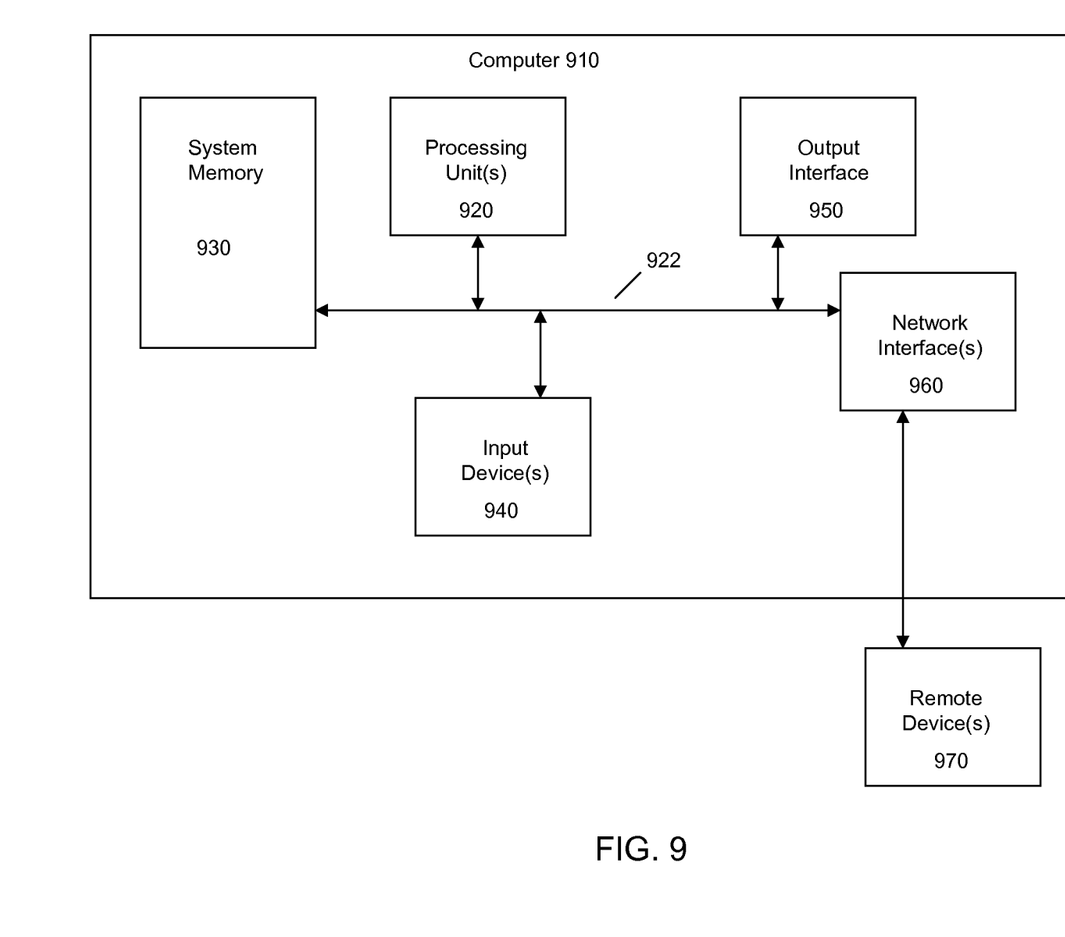
FIG. 9 illustrates an example computing device.

Referring to FIG. 9, it will be readily understood that certain embodiments can be implemented using any of a wide variety of devices or combinations of devices. An example device that may be used in implementing embodiments includes a computing device in the form of a computer 910, which may take the form of a server, a workstation computer, a mobile device, and the like. In this regard, the computer 910 may execute program instructions configured to provide predictive placement of content through network analysis, and perform other functionality of the embodiments, as described herein.

Components of computer 910 may include, but are not limited to, at least one processing unit 920, a system memory 930, and a system bus 922 that couples various system components including the system memory 930 to the processing unit(s) 920. The computer 910 may include or have access to a variety of computer readable media. The system memory 930 may include computer readable storage media in the form of volatile and/or nonvolatile memory such as read only memory (ROM) and/or random access memory (RAM). By way of example, and not limitation, system memory 930 may also include an operating system, application programs, other program modules, and program data.

A user can interface with (for example, enter commands and information) the computer 910 through input devices 940. A monitor or other type of device can also be connected to the system bus 922 via an interface, such as an output interface 950. In addition to a monitor, computers may also include other peripheral output devices. The computer 910 may operate in a networked or distributed environment using logical connections (network interface 960) to other remote computers or databases (remote device(s) 970). The logical connections may include a network, such as a local area network (LAN), a wide area network (WAN), a cellular network, but may also include other networks.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:

transmitting a message template comprising at least one template element to a plurality of receiver devices, the at least one template element comprising (i) at least one rule and (ii) content having at least one customized element;

wherein the at least one template element further comprises at least one message edit trigger;

wherein the content is automatically edited at a service provider responsive to a triggering event based on the at least one message edit trigger;

receiving at least one instantiation request responsive to the message template being opened by receiver devices;

instantiating the message template as at least one customized message, which is edited based on the at least one rule and at least one attribute associated with the receiver devices opening the message template, wherein the at least one attribute comprises at least one of: receiver device user demographic information and receiver user customized message interaction history;

wherein the at least one customized message comprises a specified value for the at least one customized element;

the triggering event comprising the at least one customized message being opened by a threshold number of the receiver devices, wherein the threshold number of the receiver devices are grouped by social attributes and opening time intervals;

generating a further modified customized edit to the at least one customized message responsive to the triggering event; and transmitting to receiver devices the further edited customized message.

2. The method according to claim 1, wherein the at least one receiving device comprises a telecommunication device.

3. The method according to claim 2, wherein the message template is transmitted via short message service.

4. The method according to claim 1, wherein the at least one template element comprises a timeout value.

5. The method according to claim 4, comprising re-instantiating the message template responsive to expiration of the timeout value.

6. The method according to claim 1, wherein the at least one message element comprises a timing element, the specified value for the at least one customized element being determined based on a time that the message template is instantiated according to the timing element.

7. The method according to claim 1, wherein:
said instantiating is performed at a back-end service provider;
said transmitting comprises transmitting a message template in the form of an SMS message; and
the message template further includes a campaign summary, campaign content, template evaluation rules and a template re-instantiation timeout.

8. A system comprising:
at least one processor; and
a memory device operatively connected to the at least one processor;
wherein, responsive to execution of program instructions stored on the memory device and accessible to the at least one processor, the at least one processor is configured to:
transmit a message template comprising at least one template element to a plurality of receiver devices, the at least one template element comprising (i) at least one rule and (ii) content having at least one customized element;
wherein the at least one template element further comprises at least one message edit trigger;
wherein the content is automatically edited at a service provider responsive to a triggering event based on the at least one message edit trigger;
receive at least one instantiation request responsive to the message template being opened by receiver devices;
instantiate the message template as at least one customized message, which is edited based on the at least one rule and at least one attribute associated with the receiver devices opening the message template, wherein the at least one attribute comprises at least one of: receiver device user demographic information and receiver user customized message interaction history;

wherein the at least one customized message comprises a specified value for the at least one customized element;

the triggering event comprising the at least one customized message being opened by a threshold number of the receiver devices, wherein the threshold number of the receiver devices are grouped by social attributes and opening time intervals;

generate a further modified customized edit to the at least one customized message responsive to the triggering event; and transmit to receiver devices the further edited customized message.

9. The system according to claim 8, wherein the at least one receiving device comprises a telecommunication device.

10. The system according to claim 9, wherein the message template is transmitted via short message service.

11. The system according to claim 8, wherein the at least one template element comprises a timeout value.

12. The system according to claim 11, comprising re-instantiating the message template responsive to expiration of the timeout value.

13. The system according to claim 8, wherein the at least one message element comprises a timing element, the specified value for the at least one customized element being determined based on a time that the message template is instantiated according to the timing element.

14. A computer program product comprising:
a non-transitory computer readable storage medium having computer readable program code embodied therewith, the computer readable program code comprising:
computer readable program code configured to transmit a message template comprising at least one template element to a plurality of receiver devices, the at least one template element comprising (i) at least one rule and (ii) content having at least one customized element;
wherein the at least one template element further comprises at least one message edit trigger;
wherein the content is automatically edited at a service provider responsive to a triggering event based on the at least one message edit trigger;
computer readable program code configured to receive at least one instantiation request responsive to the message template being opened by receiver devices;
computer readable program code configured to instantiate the message template as at least one customized message, which is edited based on the at least one rule and at least one attribute associated with the receiver devices opening the message template, wherein the at least one attribute comprises at least one of: receiver device user demographic information and receiver user customized message interaction history;

wherein the at least one customized message comprises a specified value for the at least one customized element;

the triggering event comprising the at least one customized message being opened by a threshold number of the receiver devices, wherein the threshold number of the receiver devices are grouped by social attributes and opening time intervals;

generate a further modified customized edit to the at least one customized message responsive to the triggering event; and transmit to receiver devices the further edited customized message.

* * * * *